United States Patent
Zhu et al.

(10) Patent No.: US 10,075,420 B2
(45) Date of Patent: Sep. 11, 2018

(54) SHARED CIRCUIT SWITCHED SECURITY CONTEXT

(75) Inventors: Xipeng Zhu, San Diego, CA (US); Wolfgang Granzow, San Diego, CA (US); Adrian Edward Escott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 13/639,469

(22) PCT Filed: May 4, 2010

(86) PCT No.: PCT/CN2010/072413
§ 371 (c)(1),
(2), (4) Date: Oct. 29, 2013

(87) PCT Pub. No.: WO2011/137580
PCT Pub. Date: Nov. 10, 2011

(65) Prior Publication Data
US 2014/0059662 A1 Feb. 27, 2014

(51) Int. Cl.
*H04L 29/06* (2006.01)
*H04L 9/32* (2006.01)
(Continued)

(52) U.S. Cl.
CPC .......... *H04L 63/06* (2013.01); *H04L 9/0841* (2013.01); *H04L 9/0869* (2013.01);
(Continued)

(58) Field of Classification Search
CPC ..... H04W 12/06; H04W 36/14; H04W 12/04; H04W 76/02; H04L 69/24
See application file for complete search history.

(56) References Cited

U.S. PATENT DOCUMENTS 7,574,599 B1* 8/2009 Zhang ........................ 713/168
8,526,617 B2* 9/2013 Wu .............................. 380/270
(Continued)

FOREIGN PATENT DOCUMENTS

CN 1622510 A 6/2005
CN 101299666 A * 11/2008 ............ H04W 12/04
(Continued)

OTHER PUBLICATIONS

3GPPP, 3rd Generation Partnership Project; Technical Specification Group Services and System Aspects; 3GPP System Architecture Evolution (SAE): Security architecture; (Release 8), Mar. 2009, 3GPP, 61 Pages.*
(Continued)

*Primary Examiner* — Farid Homayounmehr
*Assistant Examiner* — Christopher C Harris
(74) *Attorney, Agent, or Firm* — Arent Fox LLP

(57) ABSTRACT

Creation of update of a security context between user equipment and MSC/VLR (Mobile Switching Centre/Visitor Location Register) for circuit switched domain services is provided. The creation or update is based on conversion of the security context used in an evolved Universal Terrestrial Radio Access Network (E-UTRAN) in the Mobility Management Entity (MME) to a security context for the circuit switched domain target system and transferring it to a MSC/VLR. When user equipment is moved from E-UTRAN to GSM EDGE Radio Access Network/Universal Terrestrial Radio Access Network (GERAN/UTRAN), a MME does not need to perform authentication and key agreement procedures to establish shared circuit switched security context for the user equipment.

26 Claims, 11 Drawing Sheets

(51) Int. Cl.
    *H04W 36/00*   (2009.01)
    *H04L 9/08*    (2006.01)
    *H04W 12/04*   (2009.01)

(52) U.S. Cl.
    CPC ....... *H04L 9/3271* (2013.01); *H04W 36/0038* (2013.01); *H04L 2209/80* (2013.01); *H04W 12/04* (2013.01); *H04W 36/0022* (2013.01)

(56) References Cited

U.S. PATENT DOCUMENTS

| | | | |
|---|---|---|---|
| 2007/0060127 A1* | 3/2007 | Forsberg ..................... | 455/436 |
| 2007/0224993 A1* | 9/2007 | Forsberg ..................... | 455/436 |
| 2008/0232588 A1 | 9/2008 | Christison | |
| 2009/0042576 A1* | 2/2009 | Mukherjee et al. .......... | 455/436 |
| 2009/0111428 A1* | 4/2009 | Blommaert et al. .......... | 455/411 |
| 2009/0129342 A1* | 5/2009 | Hwang et al. ................ | 370/331 |
| 2009/0258631 A1* | 10/2009 | Forsberg et al. ............. | 455/411 |
| 2009/0271623 A1* | 10/2009 | Forsberg et al. ............. | 713/168 |
| 2009/0316656 A1* | 12/2009 | Zhao et al. ................... | 370/331 |
| 2010/0135246 A1* | 6/2010 | Hallental .......... H04W 36/0022 | 370/331 |
| 2010/0220862 A1* | 9/2010 | Geary .................. H04W 12/04 | 380/272 |
| 2010/0313024 A1* | 12/2010 | Weniger et al. .............. | 713/170 |
| 2010/0323700 A1* | 12/2010 | Bachmann et al. .......... | 455/436 |
| 2011/0004762 A1* | 1/2011 | Horn .............................. | 713/171 |
| 2011/0038480 A1* | 2/2011 | Lin .............................. | 380/270 |
| 2011/0111731 A1* | 5/2011 | Iwamura ............... H04W 12/08 | 455/410 |
| 2011/0142239 A1* | 6/2011 | Suh ....................... H04W 12/02 | 380/270 |
| 2011/0159841 A1* | 6/2011 | Escott et al. .................. | 455/410 |
| 2011/0176680 A1* | 7/2011 | Wu ....................... H04W 12/04 | 380/277 |
| 2011/0201337 A1* | 8/2011 | Forsberg et al. ............. | 455/436 |
| 2012/0039303 A1* | 2/2012 | Stenfelt ............. H04W 36/0022 | 370/331 |
| 2013/0137403 A1* | 5/2013 | Feng et al. .................... | 455/411 |
| 2015/0043734 A1* | 2/2015 | Escott .................. H04W 12/04 | 380/270 |

FOREIGN PATENT DOCUMENTS

| | | |
|---|---|---|
| CN | 101483850 A | 7/2009 |
| JP | 2009105739 A | 5/2009 |
| WO | WO-2009117588 A1 | 9/2009 |

OTHER PUBLICATIONS

3rd Generation Partnership Project (3GPP TM): "3GPP TS 33.401 V8.2.1 (Dec. 2008), 3rd Generation Partnership Project; Technical Specification Group Services and System Aspects; 3GPP System Architecture Evolution (SAE): Security Architecture", Dec. 19, 2008 (Dec. 19, 2008), 3GPP TS 33.401 V8.2.1, pp. 1-58, XP002574135.
3rd Generation Partnership Project; Technical Specification Group Services and System Aspects; 3GPP System Architecture Evolution (SAE); Security architecture (Release 9), 3GPP Standard; 3GPP TS 33.401, 3rd Generation Partnership Project (3GPP), Mobile Competence Centre ; 650, Route Des Lucioles ; F-06921 Sophia-Antipolis Cedex ; France, No. V9.3.1, Apr. 14, 2010 (Apr. 14, 2010), pp. 1-104, XP050402537, [retrieved on Apr. 14, 2010] p. 29, line 1—p. 33, line 38 figures 6.2-1.
3rd Generation Partnership Project; Technical Specification Group Services and System Aspects; Circuit Switched (CS) fallback in Evolved Packet System (EPS); Stage 2 (Release 9 ), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.3.0, Mar. 26, 2010 (Mar. 26, 2010), pp. 1-66, XP050402081, [retrieved on Mar. 26, 2010].
"3rd Generation Partnership Project; Technical Specification Group Services and system Aspects; Security related network functions (Release 9)", 3GPP Standard; 3GPP TS 43.020, 3rd Generation Partnership Project (3GPP), Mobile Competence Centre; 650, Route Des Lucioles; F-06921 Sophia-Antipolis Cedex; France, No. V9.1.0, Dec. 18, 2009 (Dec. 18, 2009), pp. 1-110, XP050401370, [retrieved on Dec. 18, 2009] p. 11, line 1—p. 19, line 7 p. 25, line 16—p. 29, line 9.
International Search Report and Written Opinion—PCT/CN2010/072413, International Search Authority—European Patent Office—Feb. 17, 2011.
Qualcomm Incorporated: "Create or Update CS Security context by mapping from EPS Security", 3GPP TSG SA WG2 Meeting #79, S2-102620, May 14, 2010, pp. 5.
Supplementary European Search Report—EP10850950—Search Authority—The Hague—dated Dec. 18, 2013.

\* cited by examiner

SHARED CIRCUIT SWITCHED SECURITY CONTEXT

BACKGROUND

I. Field

The following description relates generally to wireless communications and more particularly to security management.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems. Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. The forward link (or downlink) refers so the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (e.g., the information bits) is first encoded with a particular coding scheme to generate coded bits, and the coded bits are further grouped into multi-bit symbols that are then mapped to modulation symbols. Each modulation symbol corresponds to a point in a signal constellation denned by a particular modulation scheme (e.g., M-PSK or M-QAM) used for data transmission. At each time interval that may be dependent on the bandwidth of each frequency subcarrier, a modulation symbol may be transmitted on each of the frequency sub-carriers. Thus, OFDM may be used to combat inter-symbol interference (ISI) caused by frequency selective fading, which is characterized by different amounts of attenuate across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Generally, each of the NS independent channels corresponds to a dimension. The MIMO system can provide improved performance (e.g., higher throughput and/or greater reliability), if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with creation or update of a security context between user equipment and MSC/VLR (Mobile Switching Centre/Visitor Location Register) for circuit switched domain services. The creation or update is based on conversion of the security context used in an evolved Universal Terrestrial Radio Access Network (E-UTRAN) in the Mobility Management Entity (MME) to a security context for the circuit switched domain target system and transferring it to a MSC/VLR. When user equipment is moved from E-UTRAN to GSM EDGE Radio Access Network/Universal Terrestrial Radio Access Network (GERAN/UTRAN), a MME does not need to perform authentication and key agreement procedures to establish shared circuit switched security context for the user equipment.

According to an aspect is a method for creation or update of shared circuit switched domain security context. Method comprises receiving a request from a user equipment to create or update a circuit switched security context and mapping a current security context into the circuit switched security context. Method also comprises notifying a network node of the circuit switched security context and conveying a key set identifier to the user equipment, wherein the key set identifier is assigned to the circuit switched security context.

Another aspect relates to a wireless communications apparatus comprising a memory and a processor. Memory retains instructions related to receiving a request from a user equipment to create or update a circuit switched security context and mapping a current security context into the circuit switched security context. Memory also retains instructions related to notifying a network node of the circuit switched security context and conveying a key set identifier to the user equipment, wherein the key set identifier is assigned to the circuit switched security context. Processor is coupled to memory and is configured to execute instructions retained in memory.

Another aspect relates to a wireless communications apparatus that updates or creates shared circuit switched domain security context. Wireless communications apparatus comprises means for receiving a request from a user equipment to create or update a circuit switched security context and means for mapping a current security context into the circuit switched security context. Wireless communications apparatus also comprises means for notifying a network node of the circuit switched security context and means for conveying a key set identifier to the user equipment, wherein the key set identifier is assigned to the circuit switched security context.

In accordance with some aspects, means for receiving comprises means for receiving at least one of an indicator or an existing key set identifier for the circuit switched domain. According to some aspects, means for receiving comprises means for receiving an attach request, a tracking area update message, or a routing area update message. In accordance with some aspects, wireless communications apparatus comprises means for receiving from the network node a location update accept message, wherein the key set identifier is included in the location update accept message. In accordance with some aspects, means for notifying comprises means for sending the circuit switched security context with a location update request message.

According to some aspects, means for mapping comprises means for using a key derivation function and means for selecting as an input to the key derivation function at least one of a K_ASME, NAS COUNT, or CS PLMN ID. In accordance with some aspects, means for mapping comprises means for inputting a NONCE_UE and a NONCE_SGSN as inputs to a key derivation function, wherein the NONCE_UE is generated by the user equipment, means for generating keys CK and IK, and means for indicating the NONCE_SGSN and new CS_KSI in an attach message or a RAU accept message.

Another aspect relates to a computer program product comprising a computer-readable medium. Included in computer-readable medium are a first set of codes for causing a computer to receive a request from a user equipment to create or update a circuit switched security context and a second set of codes for causing the computer to map a current security context into the circuit switched security context. Also included are a third set of codes for causing the computer to notify a network node of the circuit switched security context and a fourth set of codes for causing the computer to convey a key set identifier to the user equipment, wherein the key set identifier is assigned to the circuit switched security context.

Yet another aspect relates to at least one processor configured to create or update of shared circuit switched domain security context. At least one processor comprises a first module that receives a request from a user equipment to create or update a circuit switched security context and a second module that maps a current security context into the circuit switched security context. At least one processor also comprises a third module that notifies a network node of the circuit switched security context and a fourth module that conveys a key set identifier to the user equipment, wherein the key set identifier is assigned to the circuit switched security context.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

Appendix A is an article describing various aspects and features associated with particular aspects—this appendix is to be considered part of the specification of the subject application.

Appendix B describes various aspects and features associated with particular aspects—this appendix is to be considered part of the specification of the subject application.

DETAILED DESCRIPTION

Various aspects are now described with reference to the drawings. In the following description, for purposes of explanation, numerous specific details are set forth in order to provide a thorough understanding of one or more aspects. It may be evident, however that such aspect(s) may be practiced without these specific details. In other instances, well-known structures and devices are shown in block diagram form in order to facilitate describing these aspects.

Figure 1:
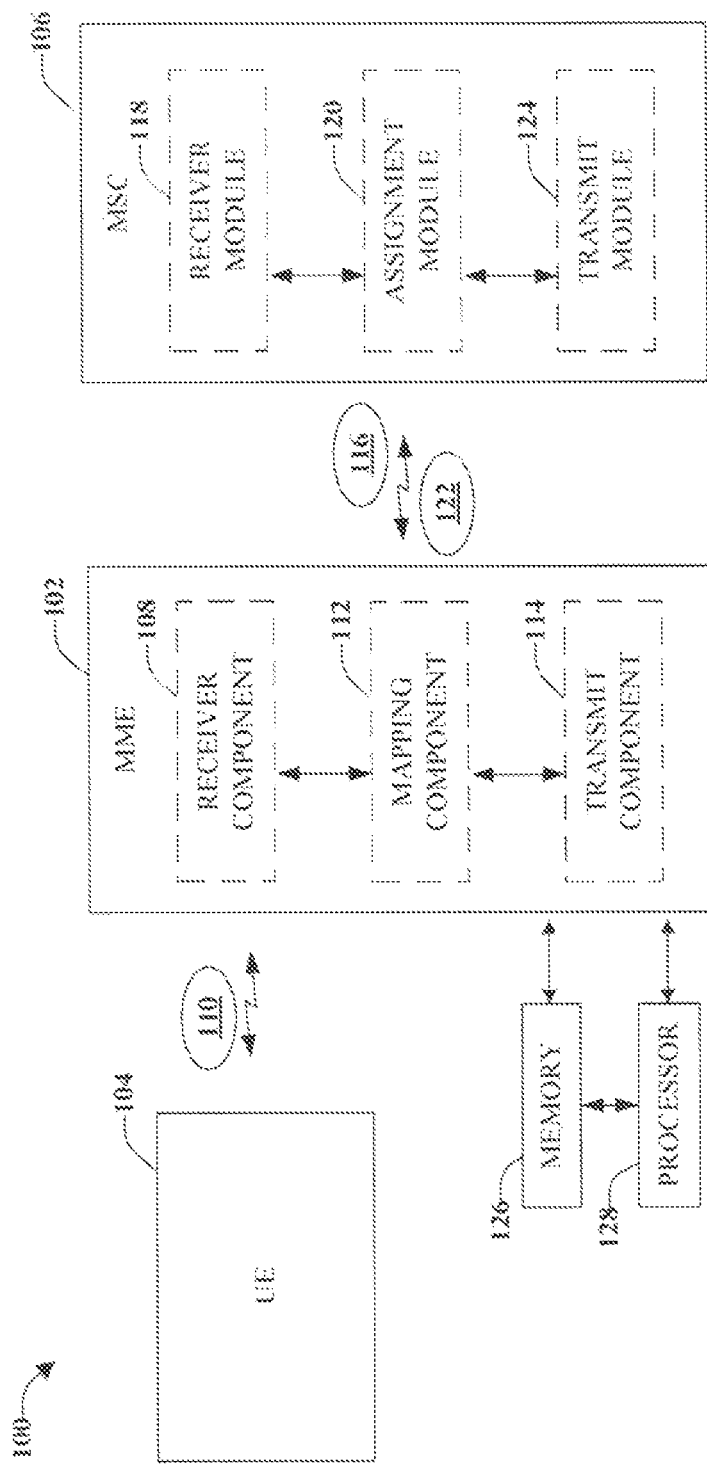
FIG. 1 illustrates a system that improves circuit switched fallback security, according to an aspect.

With reference to FIG. 1. illustrated is a system 100 that improves circuit switched fallback security, according to an aspect. System 100 is configured to create or update a security context between User Equipment (UE) and MSC/VLR (Mobile Switching Centre/Visitor Location Register) for Circuit Switched domain services. System 100 can convert a security context used in E-UTRAN (Evolved Universal Terrestrial Radio Access Network) in a MME (Mobility Management Entity) to a security context for the circuit switched domain target system and transfer the security context to the MSC.

To obtain voice services in EPS (Evolved Packet Core) networks that do not support IP Multimedia Subsystem (IMS) Packet Switched (PS) voice services, a UE performs Circuit Switched (CS) Fallback (CSFB). In some CSFB procedures, combined EPS/IMSI attached can combine TA/LA update procedures do not create or update a security context between UE and MSC/VLR for CS domain services. Therefore, when CSFB from E-UTRAN to CERAN/UTRAN is performed, the MSC may need to perform an Authentication and Key Agreement (AKA) procedures as part of the CS call setup to create a shared CS security context with the UE. This is needed unless the UE and CS domain already have established a CS security context in previous GERAN/UTRAN registrations or CS domain calls. The AKA procedure can slow down the CSFB call setup significantly. The disclosed aspects are configured to mitigate the need to perform AKA at CS call setup and, therefore, can significantly reduce call setup latency of CSFB schemes.

A node, such as a MME 102, exchanges data and communication signals with a UE 104 and a MSC 106. Although there can be more than one node, more than one UE 104, and more than one MSC 106 in system 100, only one of each is illustrated for purposes of simplicity. Further, although not illustrated, there can be other nodes or devices within system (e.g., RNC, HSS, and so forth).

MME 102 is configured to receive, such as at a receiver component 108 a request 110 from UE 104 to create or update a Circuit Switched security context. The request 110 can include a special indicator (e.g., a CS security update indictor) and/or an already existing Key Set Identifier (KSI) for CS domain (e.g., CS_KSI). For example, a KSI setting of "111" (or another string or code) cart be utilized to indicate there is no existing security context. In accordance with some aspects, request 110 is sent in an Attach Request. According to some aspects, request 110 is sent in TAU request messages. According to other aspects, request 110 is sent in RAU request messages.

At about the same time as receiving request 110 a mapping component 112 of MME 102, accesses the current security context used in E-UTRAN/EPS and maps the current security context into a CS security context. In accordance with some aspects, mapping component 112 can use a Key Derivation Function (KDF) with K_ASME, NAS COUNT, CS PLMN ID as input parameters.

The generated CS security context 116 is sent (such as by a transmitter component 214). In accordance with some aspects, the generated CS security context is conveyed to the MSC/VLR with a Location Update Request message.

MSC 106 accepts the CS Security context 116 (such as at a receiver module 118). An assignment module 120 is configured to assign a new CS_KSI 122. The new CS_KSI 122 is conveyed to the MME 102 (such as by a transmit module 124). The new KSI 122 can be sent at substantially the same time as a Location Update Accept message.

At about the same time as receiving new CS_KSI 122, MME 102 communicates the new CS_KSI 122 to UE 104 (such as with transmit component 114). The new CS_KSI 122 can be transmitted to UE 104 in an Attach Accept Message, a TAU Accept Message, or a RAU Accept Message.

After receiving the CS_KSI, UE 104 derives a CS security context in a similar manger as MME 102 derived a CS security context. UE 104 can utilize the parameters K_ASME, NAS COUNT, CS PLMN ID as input to the KDF. The CS_KSI received with Attach or TAU Accept message acts as the identifier of the mapped CS security context.

When UE 104 moves from E-UTRAN to GERAN/UTRAN with a CS Fallback procedure, the MME 102 does not need to perform an AKA procedure to setup the shared CS security context for the UE 104.

In a similar manner, the above can be applied to combine GPRS/IMSI Attach/RAU procedures when employing the Gs interface between SGSN and MSC/VLR. The disclosed aspects save the AKA procedure in CS domain. In GPRS/IMSI Attach/RAU, the mapping should be performed from GERAN/UTRAN PS security context to CS security context. In contrast to the procedure described above, the UE should generate a nonce NONCE_UE and include it together with the old CS_KSI into the Attach or RAU Request message to guarantee freshness of the generated keys. The SGSN should generate a nonce NONCE_SGSN and use both, NONCE_UE and NONCE_SGSN, as inputs to the KDF, when generating the keys CK and IK. NONCE_SGSN is then indicated together with the new CS_KSI in the Attach or RAU Accept message to the UE.

System 100 can include memory 126 operatively coupled to MME 102. Memory 126 can be external to MME 102 or can reside within MME 102. Memory 126 retains instructions related to receiving a request from a user equipment to create or update a circuit switched security context, mapping a current security context into the circuit switched security context, notifying a network node of the circuit switched security context, and conveying a key set identifier to the user equipment, wherein the key set identifier is assigned to the circuit switched security context.

In accordance with some aspects, the instructions related to receiving comprise instructions related to receiving at least one of an indicator or an existing key set identifier for the circuit switched domain, wherein the indicator is a circuit switched security update indicator. According to some aspects, the instructions related to receiving comprise instructions related to receiving an attach request, a tracking area update message, or a routing area update message.

According to some aspects, the memory retains further instructions related to receiving from the network node a location update accept message, wherein the key set identifier is included in the location update accept message. In accordance with some aspects, the instructions related to notifying comprise instructions related to sending the circuit switched security context with a location update request message.

In some aspects, memory retains further instructions related to using a key derivation function and selecting as an input to the key derivation function at least one of a K_ASME, NAS COUNT, or CS PLMN ID. In accordance with some aspects, memory retains further instructions related to inputting a NONCE_UE and a NONCE_SGSN as inputs to a key derivation function, wherein the NONCE_UE is generated by the user equipment, generating keys CK and IK, and indicating the NONCE_SGSN and new CS_KSI in an attach message or a RAU accept message.

Memory 126 can store protocols associated with security context management, taking action to control communication between system devices, such that system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 128 can be operatively connected to MME 102 (and/or memory 126) to facilitate analysis of information related to security context in a communication network. Processor 128 can be a processor dedicated to analyzing and/or generating information received by MME 102, a processor that controls one or more components of system 100, and/or a processor that both analyzes and generates information received by MME 102 and controls one or more components of system 100.

In accordance with some aspects, processor 128 is configured to create or update of shared circuit switched domain security context. Processor 128 can include a first module that receives a request from a user equipment to create or update a circuit switched security context and a second module that maps a current security context into the circuit switched security context. Also included are a third module that notifies a network node of the circuit switched security context and a fourth module that conveys a key set identifier to the user equipment, wherein the key set identifier is assigned to the circuit switched security context.

In accordance with some aspects, the at least one processor comprises fifth module that uses a key derivation function and a sixth module that selects as an input to the key derivation function at least one of a K_ASME, NAS COUNT, or CS PLMN ID.

According to other aspects, the at least one processor comprises a fifth module that inputs a NONCE_UE and a NONCE_SGSN as inputs to a key derivation function, wherein the NONCE_UE is generated by the user equipment. Also included are a sixth module that generates keys CK and IK and a seventh module that indicates the NONCE_SGSN and new CS_KSI in an attach message or a RAU accept message.

In accordance with some aspects, a memory and a processor are operatively attached to UE 104 and/or MSC 106.

In view of exemplary systems shown and described herein, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 2:
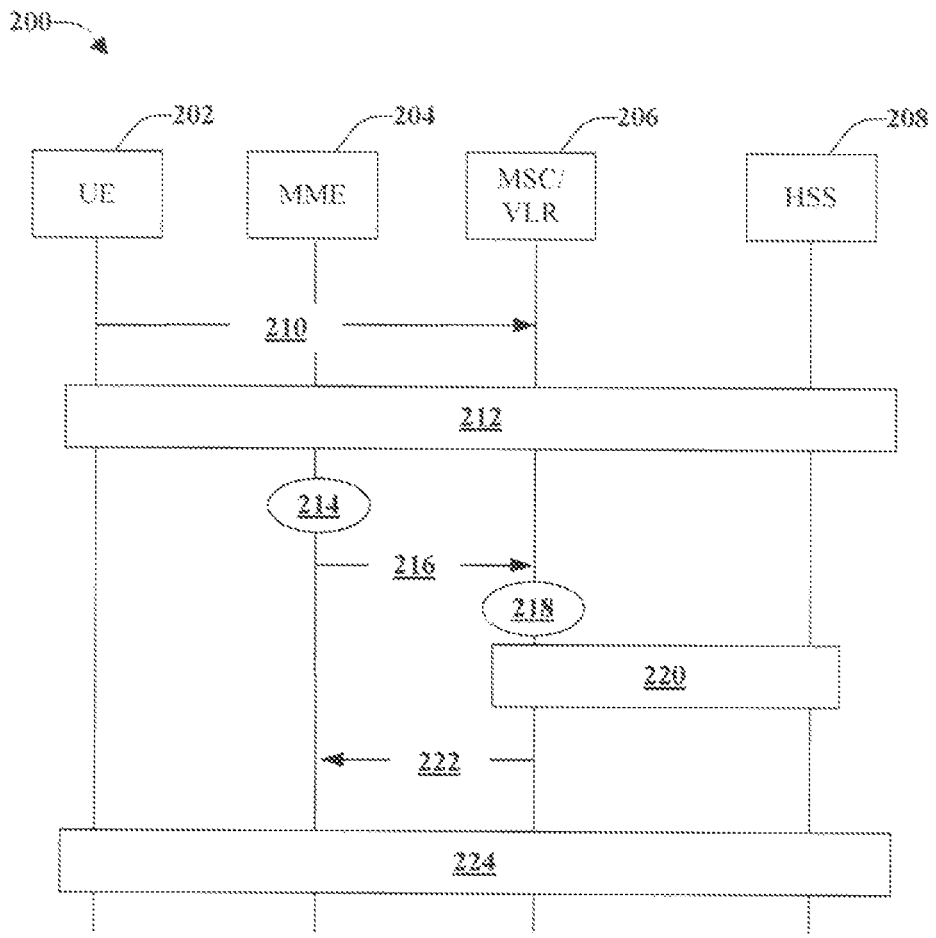
FIG. 2 illustrates a procedure for a circuit-switched fallback and short message service over SGs in evolved packet system, according to an aspect.

FIG. 2 illustrates a procedure 200 for a circuit-switched fallback and short message service ever SGs in evolved packet system, according to an aspect. Procedure 200 can be based on a combined GPRS/IMSI (General Packet Radio Service/International Mobile Subscriber Identity). Schematically illustrated by blocks are a UE 202 (User Equipment), a MME 204 (Mobility Management Entity), a MSC/VLR 206 (Mobile Switching Centre/Visitor Location Register), and a HSS 208 (Home Subscriber Server).

UE 202 initiates the attach procedure by the transmission of an Attach Request 210. In accordance with some aspects, Attach Request 210 can be transmitted based on parameters as specified in TS 23.401 [2] including the Attach Type and Mobile Station Classmark 2, CS [Circuit Switched] security update indicator, CS_KSI [Circuit Switched_Key Set Identifier]) message to MME 204. The Attach Type indicates that UE 202 requests a combined EPS/IMSI (Evolved Packet System/International Mobile Subscriber Identity) attach and informs network that UE 202 is capable and configured to use CS fallback and/or SMS (Short Message Service) over SGs, If UE 202 needs SMS service but not CSFB (Circuit Switched Fallback), UE 202 shall include an "SMS-only" indication in the combined EPS/IMSI Attach Request. See clause 5.4.4. The CS security update indicator indicates UE 202 wants to update or create its CS security context. The CS_KSI is the KSI of the CS security context currently stored on UE 202.

At 212, the EPS Attach procedure is performed as specified in TS 23.401 [2]. VLR (Visitor Location Register) shall be updated according to the combined GPRS/IMSI Attach procedure in TS 23.060 [3] if the Attach Request message includes an Attach Type Indicating that UE 202 requests a combined EPS/IMSI attach. MME 204 allocates a LAI (Location Area Identity) for UE 202.

MME 204 derives a VLR number 214 based on the allocated LAI and on an IMSI hash function defined in TS 23.226 [23]. MME 204 starts the location update procedure towards the new MSC/VLR 206 upon receipt of the subscriber data from the HSS [during the EPS Attach Procedure]). This operation marks the MS (Mobile Station as EPS-attached in the VLR.

MME 204 sends a Location Update Request 216 (new LAI, IMSI, MME name, Location Update Type, CK, IK, CS_KSI) message to the VLR. MME name is a FQDN string. It CS security update indicator is received, MME 204 sends to VLR the CK, IK mapped from EPS security context with $K_{ASME}$, NAS COUNT, CS PLMN as input.

The VLR creates an association with MME 204 by storing MME name (create SGs association 218). If CK, IK are received in the location Update Request 216 and the VLR wants to use the new security context, VLR creates or updates CS security context for the UE and allocates a KSI for the new key set.

The VLR performs Location Updating procedure in CS domain 220 The VLR responds with Location Update Accept 222 (VLR TMSI, CS_KSI to MME 204.

The EPS Attach procedure is completed, at 224, by performing step 17 to step 26 as specified in TS 23.401 [2]. Attach Accept message includes the parameters as specified in TS 23.401 [2] VLR TMSI and LAI as allocated in step 3 above and CS_KSI if MME received it from VLR. The existence of LAI and VLR TMSI indicates successful attach to CS domain.

If UE 202 requests combined EPS/IMSI Attach Request without the "SMS-only" indication, and if the network supports only SMS over SGs, the network shall perform the IMSI attach and the MME shall indicate in the Attach Accept message that the IMSI attach is for "SMS-only". When the network accepts a combined EPS/IMSI attach without limiting to "SMS-only", the network may provide a "CSFB Not Preferred" indication to the UE.

If the UE requests combined EPS/IMSI Attach Request with the "SMS-only" indication, and if the network supports SMS over SGs only or if it supports CSfB and SMS over SGs, the network shall perform the IMSI attach and the MME shall indicate in the Attach Accept message that the IMSI attach is for "SMS-only".

The network provides the "SMS-only" or "CSFB Not Preferred" indications based on locally configured operator policies based on, for example, a roaming agreement. The UE behaviour upon receiving such indications is described in TS 23.221 [26].

If CS_KSI is received, the UE creates or updates its local CS security context by deriving CK, IK by a similar mapping as performed by MME.

NOTE: The case of unsuccessful attach to CS domain is documented in stage 3 specifications, taking into account reachability for CS services of UEs that have the user preference to prioritize voice over data services and are not configured/supporting to use IMS voice services.

Figure 3:
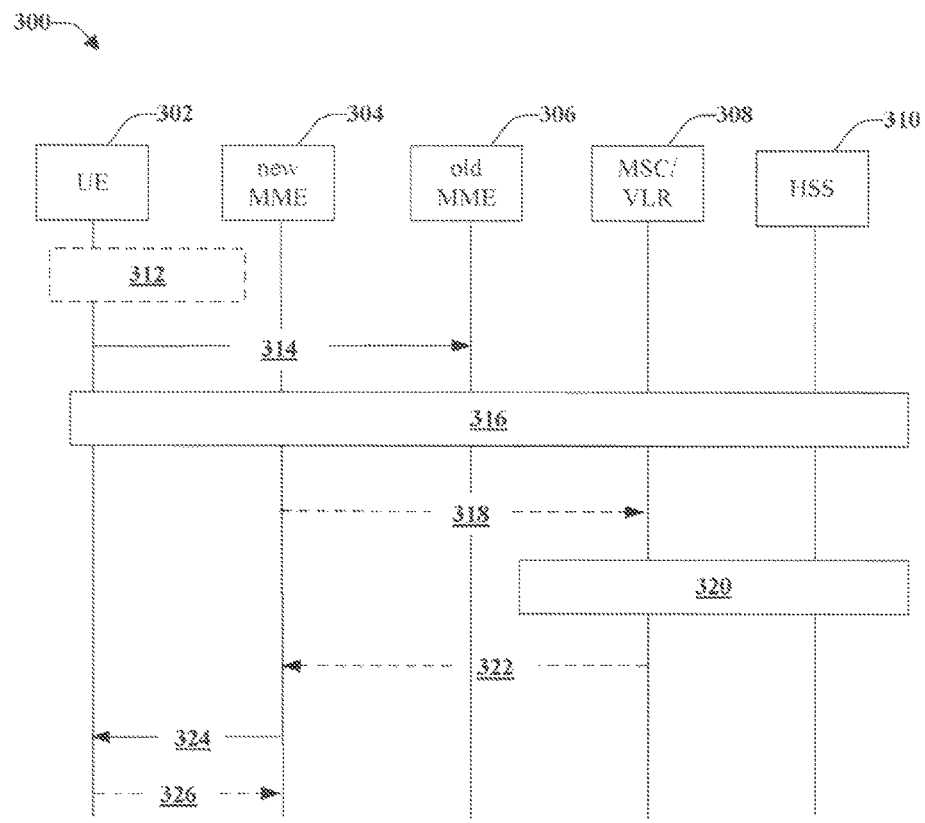
FIG. 3 illustrates a combined TA/LA procedure for the circuit switched fallback over SMS over SGs in EPS, according to an aspect.

FIG. 3 illustrates a combined TA/LA procedure 300 for the circuit switched fallback over SMS over SGs in EPS, according to an aspect. Procedure can be utilized with the combined RA/LA Update procedure specified In TS 23.000 [3]. Schematically illustrated by blocks are a UE 302 (User Equipment), a new MME 304 (Mobility Management Entity), an old MME 306, a MSC/VLR 308 ((Mobile Switching Centre/Visitor Location Register), and a HSS 310 (Home Subscriber Server).

UE 302 detects a change to a new TA by discovering that its current TAI is not in the list of TAIs that the UE registered with the network or the UEs TIN indicates the need for a TAU when re-selecting to E-UTRAN. The combined TA/LA Update Procedure is also performed in order to re-establish the SGs association. Thus, UE determines to perform TAU, at 312.

UE 302 initiates the TAU procedure by sending a TAU Request 314 (parameters as specified in TS23.401 [2] including the Update Type and Mobile Station Classmark 2) message to MME 304. The Update Type indicates that this is a combined Tracking Area/Location Area Update Request or a combined Tracking Area/Location Area Update with IMSI attach Request. If the UE needs SMS service but not CSFB, the UE shall include an "SMS-only" indication in the combined TA/LA Update procedure, see clause 5.4.4. If the UE wants to update or create its CS security context, it may include a CS security update indicator and any existing CS_KSI into the TAU Request message. The CS KSI is the KSI of the CS security context currently stored on the UE.

At 316, step 4 to step 19 of the EPS TAU procedure are performed as specified in TS 23.401 [2].

If there is an associated VLR in the MM context, the VLR also needs to be updated. The MME allocates a LAI for the UE. If the association has to be established or if the LA changed, the new MME sends a Location Update Request 318 (new LAI, IMSI, MME name, Location Update Type, CK, IK, CS_KSI) message to the VLR. The MME retrieves the corresponding VLR number from the determined LAI. If multiple MSC/VLRs serve this LAI an IMSI hash function is used to retrieve the VLR number for the LAI as defined in TS 23.236 [23]. The Location Update Type shall indicate normal location update. The MME name is a FQDN string. If CS security update indicator is received, MME sends to VLR the CK. IK mapped from EPS security context with $K_{ASMF}$, NAS COUNT, CS PLMN as input. If the VLR wants to use this new CS security context, the VLR creates or updates it for the UE and allocates a CS_KSI for the new key set.

The VLR performs Location Update procedure in CS domain 320. The VLR responds with Location Update Accept 322 (VLR TMSI, CS_KSI) to the MME.

MME 304 sends a TAU Accept 324 (parameters as specified in TS 23.401 [2], LAI VLR TMSI, CS_KSI) message to UE 302. The VLR TMSI is optional if the VLR has not changed. LAI is determined in as per the above. The presence of the LAI indicates to the UE that it is IMSI attached. CS_KSI is included if MME received it from VLR in step 6. If the UE requests combined TA/LA Update Request without the "SMS-only" indication, and if the network supports SGs for SMS only, the network shall perform the IMSI attach and the MME shall indicate in the TAU Accept message that the IMSI attach is for "SMS-only".

If the UE requests combined TA/LA Update (or combined TA/LA Update with IMSI attach) without the "SMS-only" indication, and if the network supports only SMS over SGs, the network shall perform the combined TA/LA Update procedure and the MME shall indicate "SMS-only" in the TAU Accept message. However, if the network supports CSFB and SMS over SGs and accepts a combined TA/LA Update procedure but does not indicate "SMS-only", the MME may provide a "CSFB Not Preferred" indication to the UE.

If the UE requests combined TA/LA Update (or combined TA/LA Update with IMSI attach) with the "SMS-only" indication, and if the network only supports SMS over SGs or if it supports CSFB and SMS over SGs, the network shall perform the combined TA/LA Update procedure and the MME shall indicate in the TAU Accept message that the combined TA/LA Update procedure is for "SMS-only.

The network provides the "SMS-only" or "CSFB Not Preferred" indications based on locally configured operator policies based on e.g. roaming agreement.

The UE behaviour upon receiving such indications is described in TS 23.221 [26]. If CS_KSI is received, the UE creates or updates its local CS security context by deriving CK, IK by same mapping as MME did in step 4.

The UE may send a TAU complete message 326 as specified in TS 23.401 [2] for the TAU procedure.

Figure 4:
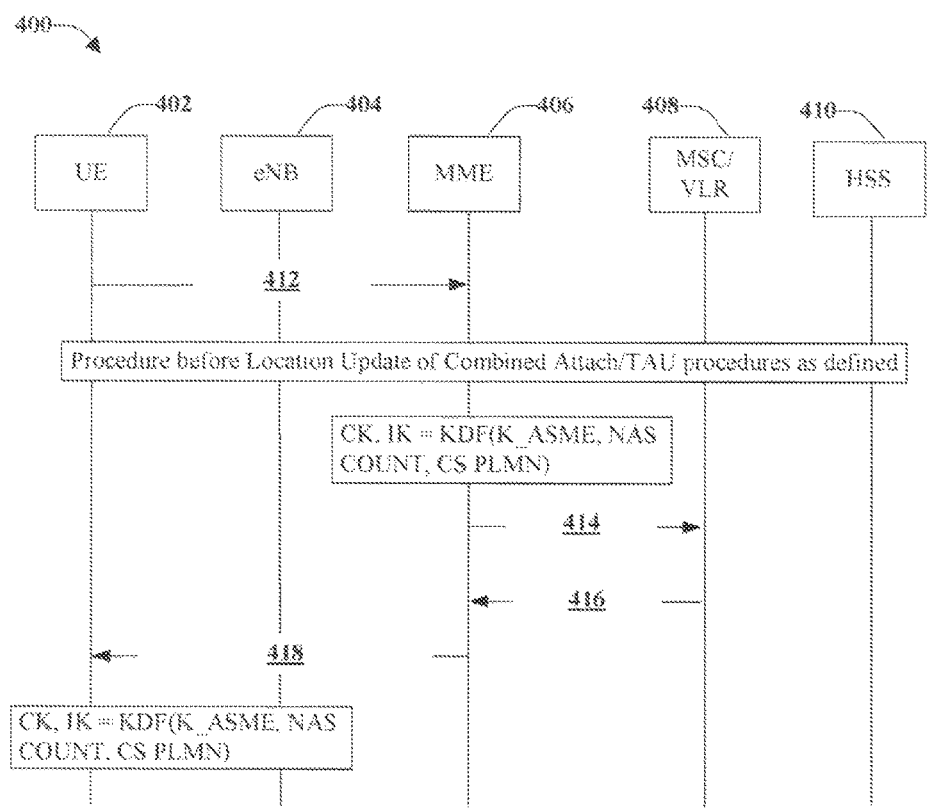
FIG. 4 illustrates a flow for a security enhancement for SGs, according to an aspect.

With reference to FIG. 4, illustrates is flow 400 for a security enhancement for SGs, according to an aspect. Schematically represented by blocks are a UE 402 (User Equipment), an eNB 404 (Evolved Node B), a MME 406 (Mobility Management Entity), a MSC/VLR 408 (Mobile Switching Centre/Visitor Location Register), and a HSS 410 (Home Subscriber Server).

To create or update a security context, at 412, UE 402 informs MME 406 that UE 402 wants to create or update a CS security context. The information from UE 402 can be sent in an Attach Request or TAU Request messages of a combined EPS/IMSI Attach or combined TA/LA update procedure (procedure before location update of combined attach/TAU procedures as defined in 23.401). In accordance with some aspects, the information is sent at substantially the same time as, for example, a special indicator (e.g., a "CS security update Indicator" and/or any already existing Key Set Identifier (KSI) for CS domain (denoted "CS_KSI"). For example, a CS_KSI setting of "111" can be used to indicate that no valid security context currently exists. However, in accordance with some aspects, another CS_KSI can be utilized and the disclosed aspects are not limited to "111".

When receiving an Attach/TAU request with indication to create/update a CS security context from UE 402, MME 408 maps it current security context used in E-UTRAN/EPS into CS security context by a Key Derivation Function (KDF) with K_ASME, NAS COUNT, CS PLMN ID as input parameters. The generated CS security context is seat, at 414, to the MSC/VLR 408 over the SGs interface with a Location Update Request message.

The MSC/VLR 408 accepts the CS security context and assigns a new CS_KSI. The new CS_KSI is sent back to the MME 406, at 416, in the Location Update Accept message.

The MME 406 returns to UE 402 the new CS_KSI to the UE 402, at 418, in the Attach or TAU Accept message. After receiving the CS_KSI, UE 402 derives a CS security context in a same way as the MME using the parameters K_ASME, NAS COUNT, CS PLMN ID as input of the KDF. The CS_KSI received with Attach or TAU accept message acts as the identifier of the mapped CS security context. When the UE then moves from E-UTRAN to GERAN/UTRAN, with a CS Fallback procedure, the MME does not need to perform an AKA procedure to setup the shared CS security context for the UE.

Figure 5:
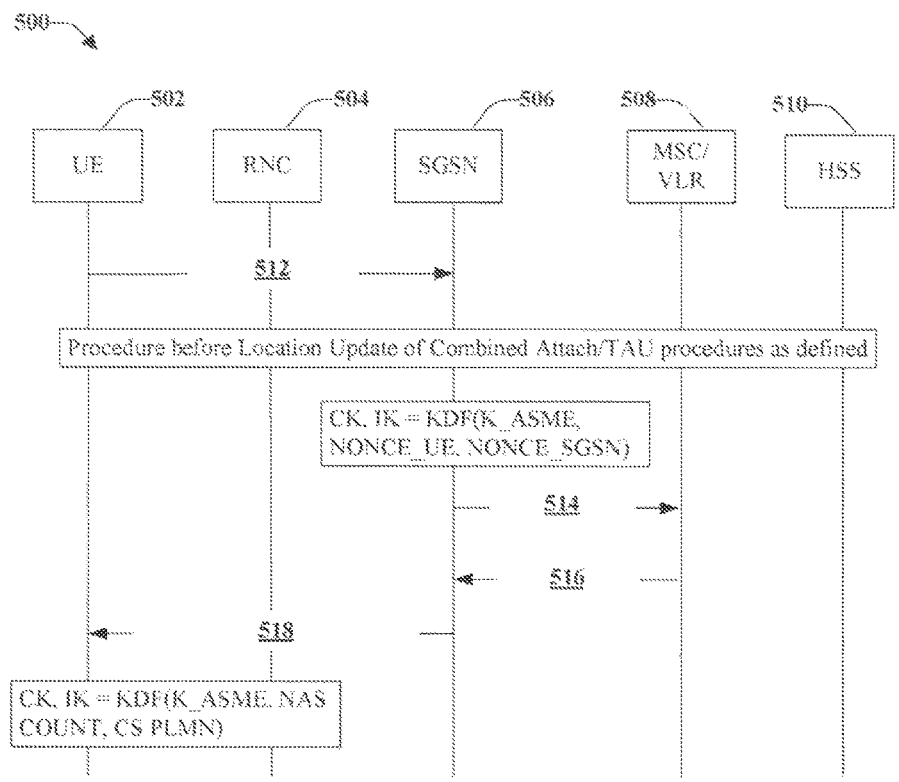
FIG. 5 illustrates an example flow for a security enhancement for Gs (such as 3G), according to an aspect.

FIG. 5 illustrates an example flow 500 for a security enhancement for Gs (such as 3G), according to an aspect. Schematically represented by blocks are a UE 402 (User Equipment), a RNC 404 (Radio Network Controller), a SGSN 406 (Serving GPRS Support Node), a MSC/VLR 408 (Mobile Switching Centre/Visitor Location Register), and a HSS 410 (Home Subscriber Server).

Flow 500 is similar to flow 400 of FIG. 4. Flow 500 is applied to combined GPRS/IMSI Attach/RAU procedures when employing the Gs interface between SGSN and MSC/VLR. Flow 500 can mitigate the need for an AKA procedure in CS domain. In GPRS/IMSI Attach/RAU, the mapping should be performed from GERAN/UTRAN PS security context to CS security context. In contract to flow 400, for flow 500, UE 502 should generate a nonce NONCE_UE and include NONCE_UE together with the old CS_KSI into the Attach or RAU Request message to help guarantee freshness of the generated keys. The SGSN should generate a nonce NONCE_SGSN and use both (NONCE_UE and NONCE_SGSN) as inputs as the KDF, when generating the keys CK and IK. NONCE_SGSN is then indicated together with the new CS_KSI in the Attach or RAU Accept message to the UE 502.

To create or update a security context at 512, UE 502 informs MME 506 that UE 502 wants to create or update a CS security context. The information from UE 502 can be sent in an Attach Request or RAU Request message. Procedure before location update of combined attach/TAU procedures as defined in 23.060. In accordance with some aspects, the information is sent at substantially the same time as, for example, a. KSI, "old CS_KSI" and/or "CS security update indicator", NONCE_UE).

When receiving an Attach/RAU request with indication to create/update a CS security context from UE 502, MME 508 maps its current security context used in E-UTRAN/EPS into CS security context by a Key Derivation Function (KDF) with K_ASME, NONCE_UE, NONCE_SGSN as input parameters. The generated CS security context is sent, at 514, to the MSC/VLR 508 with a Location Update Request message (CR, IK old CS_KSI).

The MSC/VLR 508 accepts the CS security context and assigns a new CS_KSI. The new CS_KSI is sent back to the MME 506, at 616, in the Location Update Accept message.

The MME 506 returns to UE 502 the new CS_KSI, at 418, in the Attach or RAU Accent message (new CS_KSI, NONCE_SGSN, TMSI, and so forth). After receiving the CS_KSI, UE 502 derives a CS security context in a similar manner as the MME using the parameters K_ASME, NONCE_UE, COUNT, NONCE_SGSN as input of the KDF. In accordance with some aspects, a 2G procedure is substantially the same as flow 500.

Figure 6:
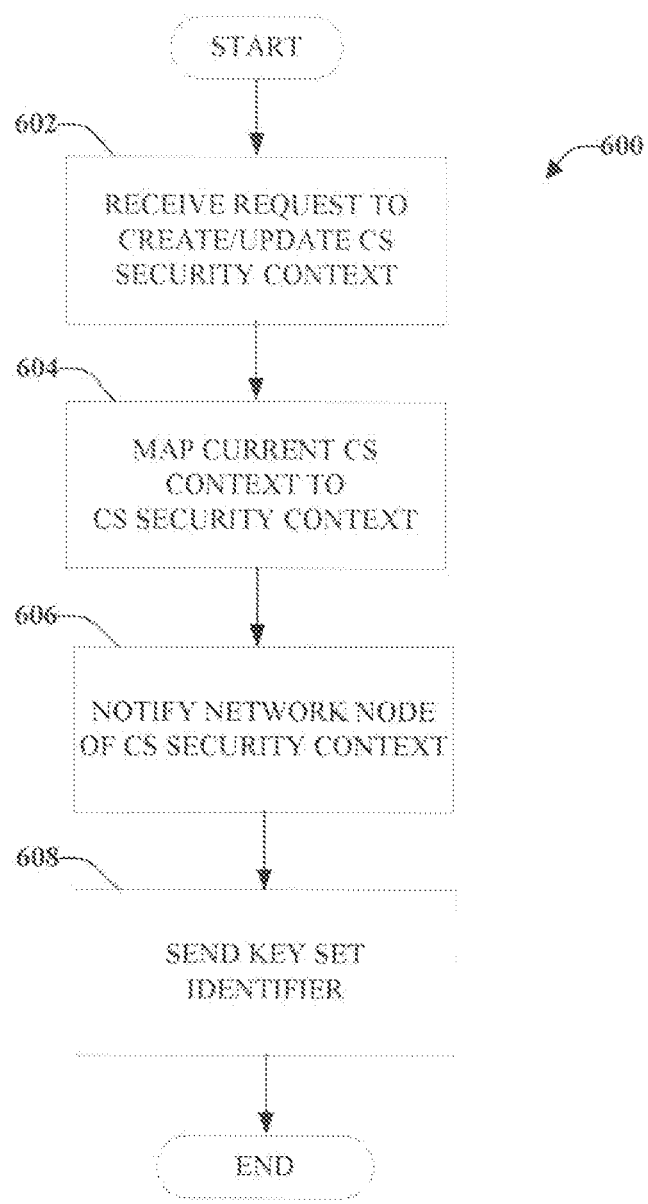
FIG. 6 illustrates a method for creation or update of shared circuit switched domain security context, according to an aspect.

With reference now to FIG. 6, illustrated is a method 600 for creation or update of shared circuit switched domain security context, according to an aspect. Method 600 starts, at 602, when a request from a user equipment to create or update a circuit switched security context is received. In accordance with some aspects, the receiving comprises receiving at least one of an indicator or an existing key set identifier for the circuit switched domain. The indicator can be a circuit switched security update indicator. In accordance with some aspects, the circuit switched security update indicator is set to 111. According to some aspects, the receiving comprises receiving an attach request, a tracking area update message, or a routing area update message.

At 604, a current security context is mapped into the circuit switched security context. In accordance with some aspects, the mapping comprises using a key derivation function and selecting as an input to the key derivation function at least one of a K_ASME, NAS COUNT, or CS PLMN ID. According to some aspects, the mapping comprises inputting a NONCE_UE and a NONCE_SGSN as inputs to a key derivation function wherein the NONCE_UE is generated by the user equipment, generating keys CK and Ik, and indicating the NONCE_SGSN and new CS_KSI in an attach message or a RAU accept message.

A network node is notified of the circuit switched security context, at 606. The network node can be a mobility switching centre. The notifying can include sending the circuit switched security context with a location update request message. At 608, a key set identifier is conveyed to the user equipment. The key set identifier is assigned to the circuit switched security context. In accordance with some aspects, method 600 includes receiving from the network node a location update accept message, wherein the key set identifier is included in the location update accept message.

In accordance with some aspects, the user equipment can derive the circuit switched security context using parameters K_ASME, NAS COUNT, or CS PLMN ID as one or more parameters to the Key Derivation Function.

In accordance with some aspects, a computer program product can include a computer-readable medium that comprises codes for carrying out various aspects of various flows, procedures, and/or methods. Computer-readable medium can include a first set of codes for causing a computer to receive a request from a user equipment to create or update a circuit switched security context and a second set of codes for causing the computer to map a current security context into the circuit switched security context. Also included are a third set of codes for causing the computer to notify a network node of the circuit switched security context and a fourth set of codes for causing the computer to convey a key set identifier to the user equipment, wherein the key set identifier is assigned to the circuit switched security context. In accordance with some aspects, the first set of codes comprises a set of codes for receiving at least one of an indicator or an existing key set identifier for the circuit switched domain. According to some aspects, the first set of codes for causing comprises a set of codes for receiving an attach request, a tracking area update message, or a routing area update message.

In combined attach or TAU, the MSC trusts MME's authentication for the UE. Therefore, UE's CS security context does not need to be established when UE is in E-UTRAN. When UE moves to GERAN/UTRAN for CSFB, the MSC has to perform AKA procedure to establish CS security context for the UE if the UE and MSC do not have shared security context. This AKA procedure significantly increases the latency of CSFB.

Even if the UE already has a CS security context acquired from previous camping in GERAN/UTRAN, the security context may not be accepted by the current serving MSC dot to e.g.; PLMN change, Operator's policy, e.g operators mandates UE authentication for attaching to MSC, the security context in MSC may have been deleted after UE detaches.

During combined attach or TAUs, the UE may inform the MME about the status of its CS security context. The MME may then calculate and send a new CS security context to the MSC/VLR. The MSC/VLR may keep that new context and assign a KSI to it. The MSC/VLR passes any assigned KSI back to the UE via the MME. The UE then calculates the new CS security context if it has received a new KSI for CS domain security.

In combined EPS/IMSI attach/TAU, MSC trusts MME and no security parameters are delivered over SGs. Hence, Combined EPS/IMSI Attach/TAU procedure doesn't establish shared CS Security Context between UE and MSC.

UE and MSC require shared security for CS call.

Shared Security is established by; either AKA procedure between UE and MSC when UE is in 2G/3G or Security Context from old MSC(s) and UE locally cached Security Context.

If MSC doesn't have shared security with UE, MSC initiates AKA during LAU or CS call setup, LAU with AKA and Identity check requires 2 seconds or LAU without AKA and Identity check requires 300 ms.

CS Security enhancement proposal: Sends mapped security context (IK, CK) to MSC via SGs interface upon request from UE in Combined Attach/TAU or IK, CK are derived from K_ASME and NAS COUNT with similar procedure as SRVCC key mapping.

Figure 7:
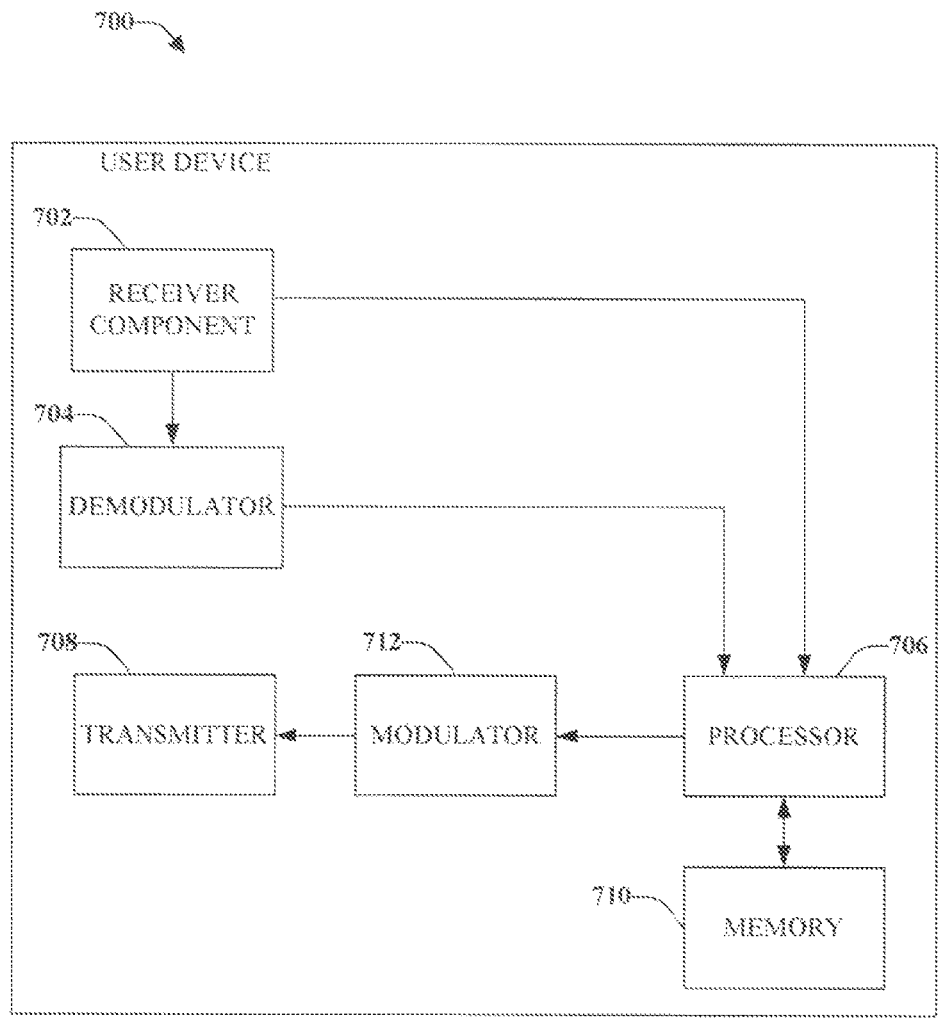
FIG. 7 illustrates a system that facilitates creating or updating a security context in accordance with one or more of the disclosed aspects.

With reference now to FIG. 7, illustrated is a system 700 that facilitates creating or updating a security context in accordance with one or more of the disclosed aspects. System 700 can reside in a user device. System 700 comprises a receiver component 702 that can receive a signal from, for example, a receiver antenna. Receiver component 702 can perform typical actions thereon, such as filtering, amplifying, downconverting, etc. the received signal. Receiver component 702 can also digitize the conditioned signal to obtain samples. A demodulator 704 can obtain received symbols for each symbol period, as well as provide received symbols to a processor 706.

Processor 706 can be a processor dedicated to analyzing information received by receiver component 702 and/or generating information for transmission by a transmitter 708. In addition or alternatively, processor 706 can control one or more components of system 700, analyze information received by receiver component 702, generate information for transmission by transmitter 708, and/or control one or more components of system 700. Processor 706 may include a controller component capable of coordinating communications with additional user devices.

System 700 can additionally comprise memory 710 operatively coupled to processor 706. Memory 710 can store information related to coordinating communications and any other suitable information. Memory 710 can additionally store protocols associated with security management. Memory 710 of the various aspects is intended to comprise, without being limited to, these and any other suitable types of memory. System 700 can further comprise a symbol modulator 712, wherein transmitter 708 transmits the modulated signal.

Figure 8:
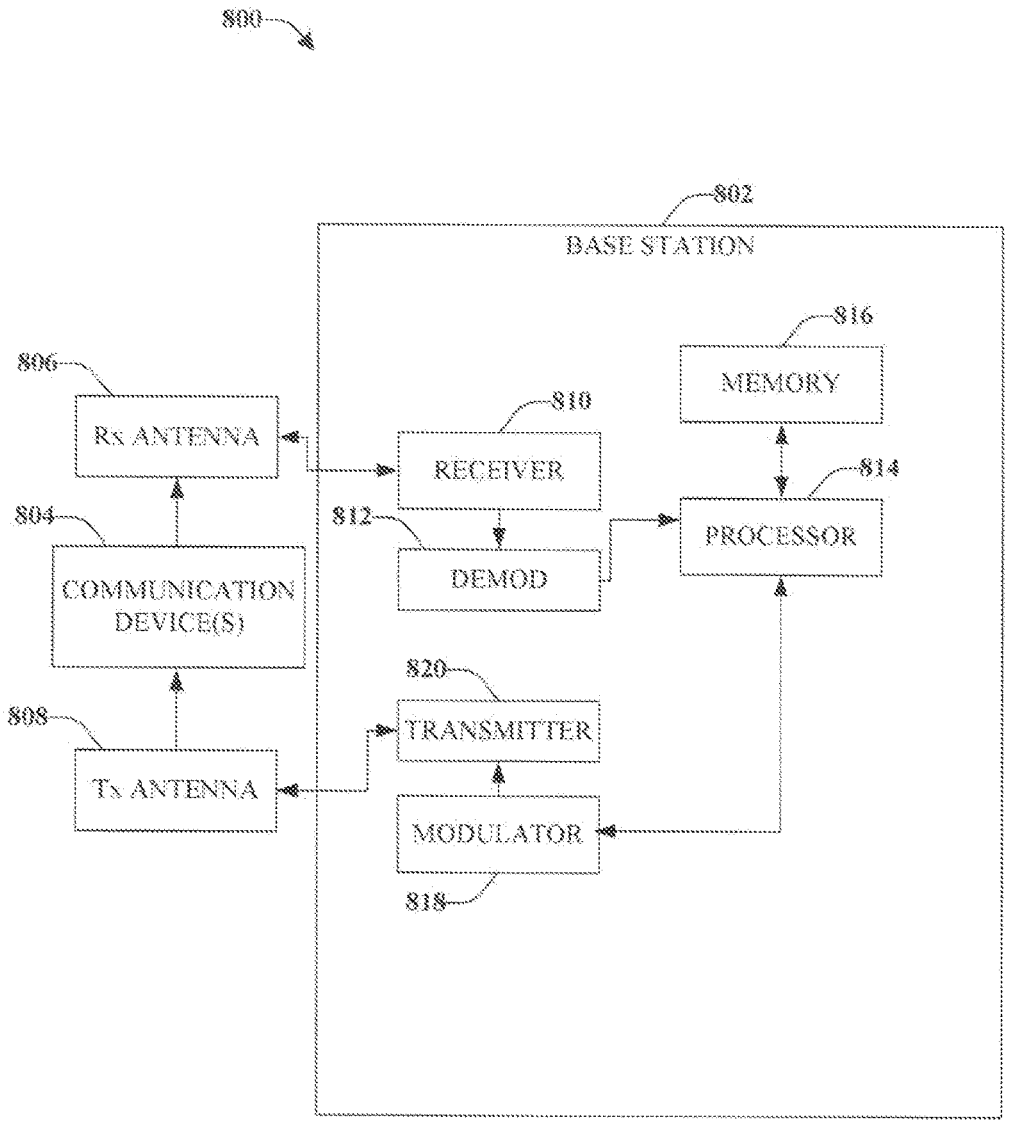
FIG. 8 illustrates a system that facilitates creating or updating a shared circuit switched domain security context in circuit switched fallback procedures in accordance with various aspects presented herein.

FIG. 8 is an illustration of a system 800 that facilitates creating or updating a shared circuit switched domain security context in circuit switched fallback procedures in accordance with various aspects presented herein. System 800 comprises a access point or base station 802. As illustrated, base station 802 receives signal(s) from one or more communication devices 804 (e.g., user device) by a receive antenna 806, and transmits to the one or more communication devices 804 through a transmit antenna 808.

Base station 802 comprises a receiver 810 that receives information from receive antenna 806 and is operatively associated with a demodulator 812 that demodulates received information. Demodulated symbols are analyzed by a processor 814 that is coupled to a memory 816 that stores information related to security management. A modulator 818 can multiplex the signal for transmission by a transmitter 820 through transmit antenna 808 to communication devices 804.

Figure 9:
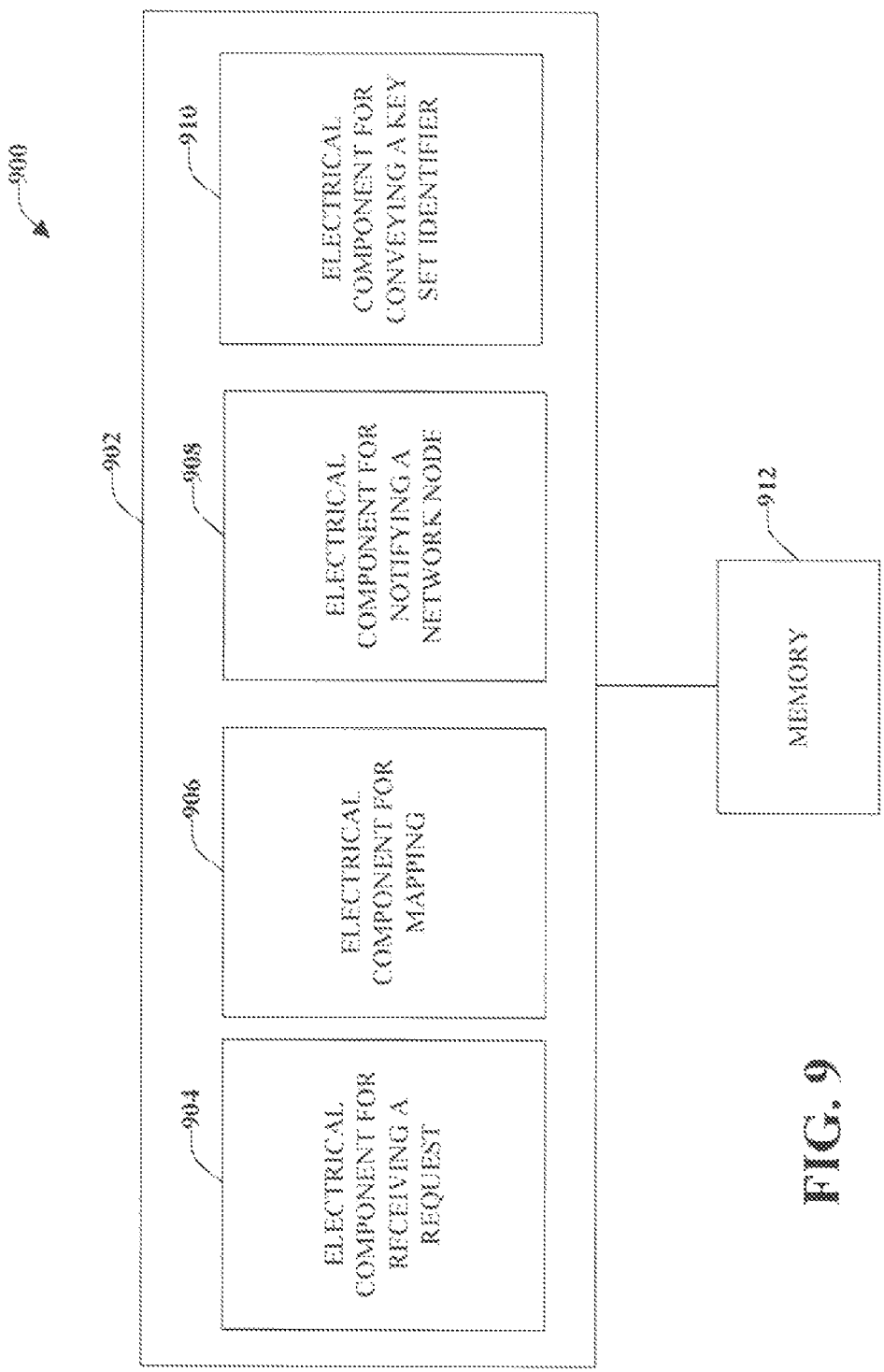
FIG. 9 illustrates an example system that updates or creates shared circuit switched domain security context, according to an aspect.

With reference to FIG. 9, illustrated is an example system 900 that updates or creates shared circuit switched domain security context, according to an aspect. System 900 may reside at least partially within a node. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 may include an electrical component 904 for receiving a request from a user equipment to create or update a circuit switched security context. In accordance with some aspects, electrical component 904 comprises an electrical component for receiving at least one of an indicator or an existing key set identifier for the circuit switched domain. In accordance with some aspects, electrical component 904 comprises an electrical component for receiving an attach request, a tracking area update message, or a routing area update message.

Also included is an electrical component 906 for mapping a current security context into the circuit switched security context. Logical grouping 902 also includes an electrical component 908 for notifying a network node of the circuit switched security context. Electrical component 908 can include an electrical component for sending the circuit switched security context with a location update request message.

Also included is an electrical component 910 for conveying a key set identifier to the user equipment, wherein the key set identifier is assigned to the circuit switched security context. In accordance with some aspects, logical grouping 902 comprises an electrical component for receiving from the network node a location update accept message, wherein the key set identifier is included in the location update accept message.

In accordance with some aspects, electrical component 906 comprises an electrical component for using a key derivation function and an electrical component for selecting as an input to the key derivation function at least one of a K_ASME, NAS COUNT, or CS PLMN ID.

According to some aspects, electrical component 906 comprises an electrical component for inputting a NON-CE_UE and a NONCE_SGSN as inputs to a key derivation function, wherein the NONCE_UE is generated by the user equipment. Electrical component 906 also comprises an electrical component for generating keys CK and IK and an electrical component for indicating the NONCE_SGSN and new CS_KSI in an attach message or a RAU accept message.

Additionally, system 900 can include a memory 912 that retains instructions for executing functions associated with electrical components 904, 906, 908, and 910 or other components. While shown as being external to memory 912 it is to be understood that one or more of electrical components 904, 906, 908, and 910 may exist within memory 912.

A simple implementation can be: UE only indicates to MME that it wants to create/update CS security context (instead of using KSI-type of indicator) Then, MME creates and sends the mapped security context to MSC over the SGs interface. MSC allocates new CS KSI to UE. If CS KSI is received by UE (this means the network supports this CSFB security enhancement), UE generates CS security context by mapping from EPS Security context.

Figure 10:
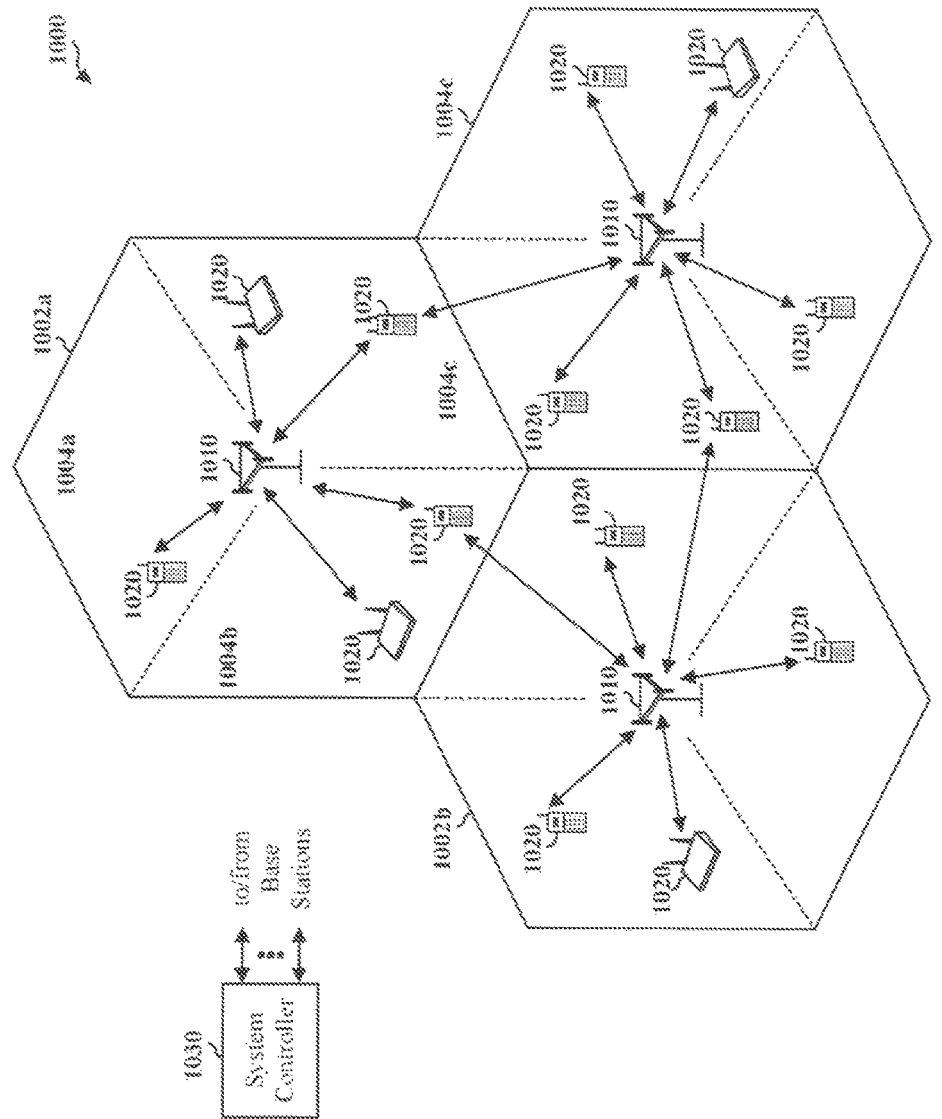
FIG. 10 illustrates a wireless communication system, according to an aspect.

This security enhancement idea is applicable to Gs interface too. i.e.; SGSN sends PS security context to MSC in combined Attach/RAU procedure. The NONCE_UE and NONCE_SGSN ensure the key freshness when working with an SGSN FIG. 10 illustrates a wireless communication system 1000 with multiple base stations (BSs) 1010 (e.g., wireless access points, wireless communication apparatus) and multiple terminals 1020 (e.g., ATs) such as can be utilized in conjunction with one or more aspects. A BS 1010 is generally a fixed station that communicates with the terminals and can also be called an access point, a Node B, or some other terminology. Each BS 1010 provides communication coverage for a particular geographic area or coverage area, illustrated as three geographic areas in FIG. 10, labeled 1002a, 1002b, and 1002c. The term "cell" can refer to a BS or its coverage area depending on the context in which the term used. To improve system capacity, a BS geographic area/coverage area can be partitioned into multiple smaller areas (e.g., three smaller areas, according to cell 1002a in FIG. 10), 1004a, 1004b, and 1004c. Each smaller area (1004a, 1004b, 1004c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1020 are typically dispersed throughout the system, and each terminal 1020 can be fixed or mobile. Terminals 1020 can also be called a mobile station, user equipment, a user device, wireless communication apparatus, an access terminal, a user terminal or some other terminology. A terminal 1020 can be a wireless device, a cellular phone, a personal digital assistant (PDA), a wireless modem card, and so on. Each terminal 1020 can communicate with zero, one, or multiple BSs 1010 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1030 couples to base stations 1010 and provides coordination and control for BSs 1010. For a distributed architecture, BSs 1010 can communicate with one another as needed (e.g., by way of a wired or wireless backhaul network communicatively coupling the BSs 1010). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 11:
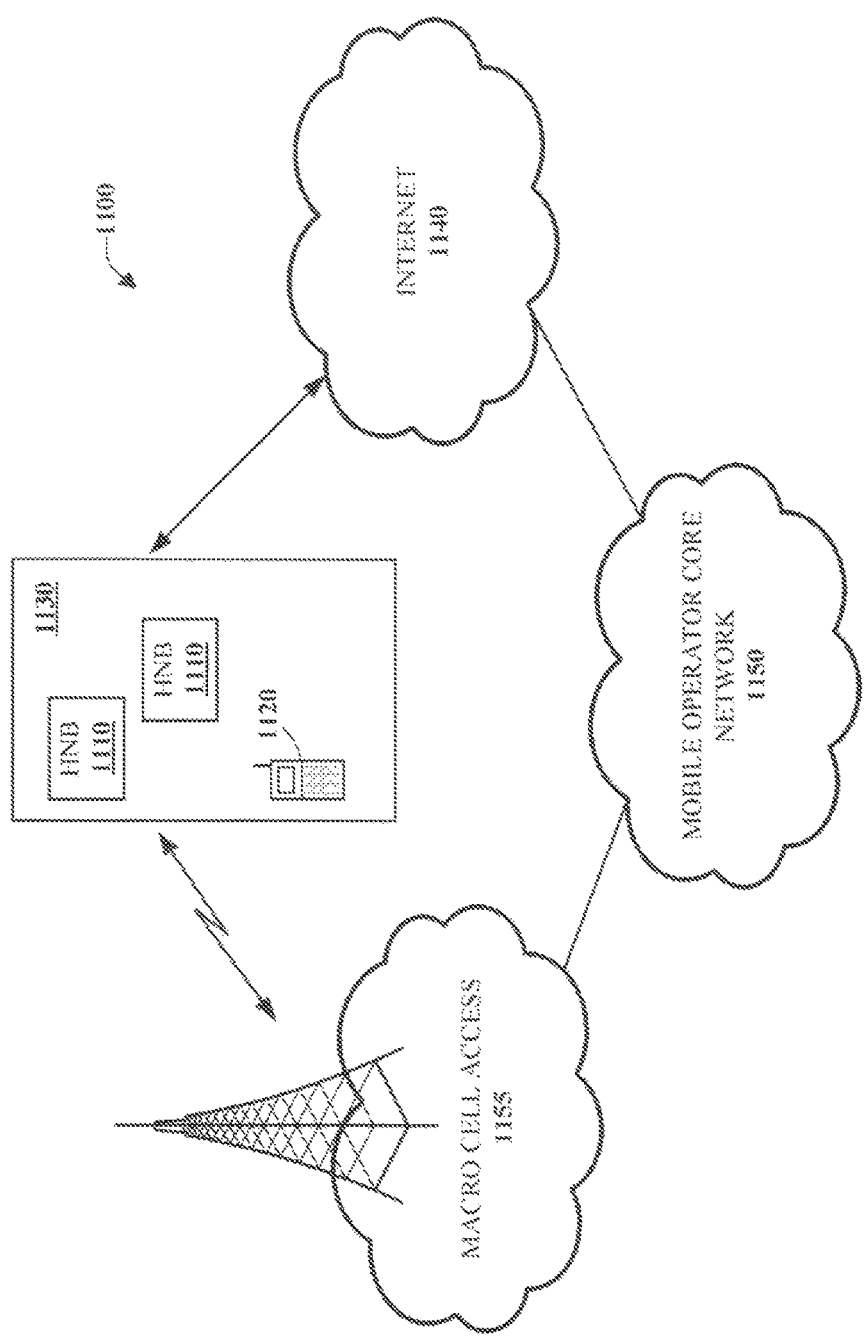
FIG. 11 illustrates a planned or semi-planned wireless communication environment, in accordance with various aspects.

FIG. 11 is an illustration of a planned or semi-planned wireless communication environment 1100, in accordance with various aspects. Communication environment 1100 includes multiple access point BSs including HNBs 1110, each of which are installed in corresponding small scale network environments. Examples of small scale network environments can include user residences, places of business, indoor/outdoor facilities 1130, and so forth. The HNBs 1110 can be configured to serve associated UEs 1120 (e.g., included in a CSG associated with HNBs 1110), or optionally alien or visitor UEs 1120 (e.g., that are not configured for the CSG of the HNB 1110). Each HNB 1110 is further coupled to the Internet 1140 and a mobile operator core network 1150 via a DSL router (not shown), or, alternatively, a cable modem, broadband over power line connection, satellite Internet connection, or a like broadband Internet connection (not shown).

To implement wireless services via HNBs 1110, an owner of the HNBs 1110 subscribes to mobile service, such as 3G mobile services, offered through the mobile operator core network 1150. Also, the UE 1120 can be capable to operate in a macro cellular environment and/or in a residential small scale network environment, utilizing various techniques described herein. Thus, at least in some disclosed aspects, HNB 1110 can be backward compatible with any suitable existing UE 1120. Furthermore, in addition to the macro cell mobile network 1155, UE 1120 is served by a predetermined number of HNBs 1110, specifically HNBs 1110 that reside within a corresponding user residence(s), place(s) of business, or indoor/outdoor facilities 1130, and cannot be in a soft handover state with the macro cell mobile network 1155 of the mobile operator core network 1150. It should be appreciated that although aspects described herein employ 3GPP terminology, it is to be understood that the aspects can also be applied to 3GPP technology (Release 99 [Rel99], Rel5, Rel6, Rel7), as well as 3GPP2 technology (1xRTT, 1xEV-DO Rel0, RevA, RevB) and other known and related technologies.

Appendix A is an article describing various aspects and features associated with particular aspects—this appendix is to be considered part of the specification of the subject application.

Appendix B describes various aspects and features associated with particular aspects—this appendix is to be considered part of the specification of the subject application.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

In an aspect of the subject disclosure, logical channels are classified into Control Channels and Traffic Channels. Logical Control Channels comprise: Broadcast Control Channel (BCCH), which is DL channel for broadcasting system control information. Paging Control Channel (PCCH), which is DL channel that transfers paging information. Multicast Control Channel (MCCH), which is Point-to-multipoint DL channel used for transmitting Multimedia Broadcast and Multicast Service (MBMS) scheduling and control information for one or several MTCHs. Generally, after establishing Radio Resource Control (RRC) connection, this channel is only used by UEs (User Equipments) that receive MBMS (Note: old MCCH+MSCH). Dedicated Control Channel (DCCH) is point-to-point bi-directional channel that transmit dedicated control information and are used by user equipment having an RRC connection. Logical Traffic Channels comprise a Dedicated Traffic Channel (DTCH), which is Point-to-point bi-directional channel dedicated to one user equipment, for the transfer of user information. Logical Traffic Channels also comprise, a Multicast Traffic Channel (MTCH) for Point-to-multipoint DL channel for transmitting traffic data.

Transport Channels are classified into DL Transport Channels and UL Transport Channels. DL Transport Channels comprise a Broadcast Channel (BCH), Downlink Shared Data Channel (DC-SDCH), and a Paging Channel (PCH). The PCH for support of user equipment power saving (DRX cycle is indicated by the network to the user equipment), broadcast over entire cell, and mapped to PHY resources which can be used for other control/traffic channels. The UL Transport Channels comprise a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH).

The UL PHY Channels comprise. Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Other terms relevant to the subject disclosure include: 3G Third Generation, 3GPP DRX Generation Partnership Project, ACLR Adjacent channel leakage ratio, ACPR Adjacent channel power ratio, ACS Adjacent channel selectivity, ADS Advanced Design System, AMC Adaptive modulation and coding. A-MPR Additional maximum power reduction, AP Application Protocol, ARQ Automatic repeat request, BCCH Broadcast control channel, BTS Base transceiver station. BW bandwidth, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, CRS Common Reference Signal, CSI Channel state information, DCI Downlink control indicator, DFT Discrete Fourier transform, DFT-SOFDM Discrete Fourier transform spread OFDM, DL Downlink (base station to subscriber transmission). DL-SCH Downlink shared channel. D-PHY 500 Mbps physical layer, DM-RS Demodulation RS (also referred to as UE specific RS), DSP Digital signal processing, DT Development toolset, DVSA Digital vector signal analysis, EDA Electronic design automation, E-DCH Enhanced dedicated channel. E-UTRAN Evolved UMTS terrestrial radio access network, eMBMS Evolved multimedia broadcast multicast service, eNB Evolved Node B, EPC Evolved packet core, EPRE Energy per resource element. ETSI European Telecommunications Standards Institute, E-UTRA Evolved UTRA, E-UTRAN Evolved UTRAN, EVM Error vector magnitude, and FDD Frequency division duplex.

Still other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access. HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface. OFDM Orthogonal frequency division multiplexing, OFDMA Orthogonal frequency division multiple access, P-GW Packet Data Network (PDN) Gateway, PAPR Peak-to-average power ratio, PAR Peak-to-average ratio, PBCH Physical broadcast channel, P-CCPCH Primary common control physical channel, PCFICH Physical control format indicator channel. PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PRB Physical Resource Block, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QoS Quality of Service, QCI, QoS Class Identifier, QPSK Quadrature phase shift keying, RACH Random access channel, RAT Radio access technology, RB Resource block, RE Resource Element, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, RTD Round Trip Delay, SAE System architecture evolution, SAP Service access point, SC-FDMA Single carrier frequency division multiple access, SDF Service Data Flow, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TEID Tunnel Endpoint Identifier, TR Technical report, TrCH Transport channel, TS Technical specification, TTA Telecommunications Technology Association, TTI Transmission time interval, UCI Uplink control indicator, UE User equipment, UL Unlink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Dish and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor of external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA ate part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g. mobile-to-mobile) ad hoc network systems often using unpaired unlicensed spectrums, 802.xx wireless LAN, BLUETOOTH, and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD). etc.), smart cards, and flash memory devices (e.g., EPROM, card, stick, key drive. etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B, or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method for creation or update of a security context, comprising:
   receiving, from a user equipment (UE) at a first network, a combined registration request for combined registration of services of the first network and services of a second network;
   receiving a request from the UE to create or update a security context of the second network maintained by the first network in connection with the combined registration and before the UE moves to the second network;
   mapping an existing current packet-switched (PS) security context of the first network into the security context of the second network in response to the request to create or update the security context;
   providing a network entity associated with the second network with the security context mapped from the existing current PS security context; and
   transmitting an indication to the user equipment to derive the security context for the second network.

2. The method of claim 1, wherein the request to create or update the security context comprises a circuit-switched security update indicator that indicates no existing circuit-switched security context or an existing key set identifier for a circuit-switched network.

3. The method of claim 1, wherein the request to create or update the security context is included in one of:
   an attach request,
   a tracking area update (TAU) message, or
   a routing area update (RAU) message.

4. The method of claim 1, further comprising:
   receiving, from a mobile switching centre/visitor location register (MSC/VLR), a location update accept message, wherein the indication is a circuit-switched key set identifier assigned from the security context and is included in the location update accept message.

5. The method of claim 1, wherein the notifying the network entity further comprises:
   sending the security context with a location update request message.

6. The method of claim 1, wherein the mapping an existing current PS security context into the security context further comprises:
   selecting, as an input to a key derivation function (KDF), at least one of:
      an access security management entity key (K ASME),
      a non-access stratum uplink count (NAS COUNT), and
      a circuit-switched public land mobile network identifier (CS PLMN ID); and
   using the KDF and the selected input to map the existing current PS security context into the security context.

7. The method of claim 6, wherein the indication indicates to the user equipment to derive the security context from the existing current PS security context using at least one of parameters K ASME, NAS COUNT, or CS PLMN ID as one or more inputs to the KDF.

8. The method of claim 1, further comprising:
   inputting a user-equipment nonce (NONCE UE) and a serving general packet radio service (GPRS) support node nonce (NONCE SGSN) into a key derivation function (KDF), wherein the NONCE UE is generated by the user equipment;
   generating a cipher key (CK) and an integrity key (IK); and
   indicating the NONCE SGSN and a circuit-switched key set identifier (CS_KSI) assigned from the security context in an attach message or a routing area update (RAU) accept message.

9. The method of claim 1, wherein the first network is a packet switched network and the second network is a circuit switched network, wherein the security context is a circuit switched security context, and wherein the network entity is a mobile switching centre/visitor location register (MSC/VLR).

10. The method of claim 1, wherein the combined registration request combines a packet switched network registration with an international mobile subscriber identity (IMSI) attachment procedure.

11. The method of claim 1, wherein the combined registration request for services includes the request to create or update the security context.

12. A wireless communications apparatus, comprising:
   a memory that retains instructions related to:
      receiving, from a user equipment (UE) at a first network, a combined registration request for combined registration of services of the first network and services of a second network;
      receiving a request from the UE to create or update a security context of the second network maintained by the first network in connection with the combined registration and before the UE moves to the second network,
      mapping an existing current packet-switched (PS) security context of the first network into the security context of the second network in response to the request to create or update the security context,
      providing a network entity associated with the second network with the security context mapped from the existing current PS security context, and
      transmitting an indication to the UE to derive the security context for the second network; and
   a processor, coupled to the memory, configured to execute the instructions retained in the memory.

13. The wireless communications apparatus of claim 12, wherein the request to create or update the security context is included in at least one of:
   an attach request,
   a tracking area update (TAU) message, or
   a routing area update (RAU) message.

14. The wireless communications apparatus of claim 12, wherein the memory retains further instructions related to:
   receiving, from a mobile switching centre/visitor location register (MSC/VLR), a location update accept message, wherein the indication is a circuit-switched key set identifier assigned from the security context and is included in the location update accept message.

15. The wireless communications apparatus of claim 12, wherein the instructions related to notifying the network entity further comprise instructions related to:
   sending the security context with a location update request message.

16. The wireless communications apparatus of claim 12, wherein the memory retains further instructions related to:
   selecting, as an input to a key derivation function (KDF), at least one of:
      an access security management entity key (K ASME),
      a non-access stratum uplink count (NAS COUNT), and
      a circuit-switched public land mobile network identifier (CS PLMN ID); and using the KDF and the selected input to map the existing current PS security context into the security context.

17. The wireless communications apparatus of claim 12, wherein the memory retains further instructions related to:
   inputting a user-equipment nonce (NONCE UE) and a serving general packet radio service (GPRS) support node nonce (NONCE SGSN) into a key derivation function (KDF), wherein the NONCE UE is generated by the user equipment;
   generating a cipher key (CK) and an integrity key (IK); and
   indicating the NONCE SGSN and a circuit-switched key set identifier (CS_KSI) assigned from the security context in an attach message or a routing area update (RAU) accept message.

18. A wireless communications apparatus that updates or creates a security context, comprising:
   means for receiving, from a user equipment (UE) at a first network, a combined registration request for combined registration of services of the first network and services of a second network;
   means for receiving a request from the UE to create or update a security context of the second network maintained by the first network in connection with the combined registration and before the UE moves to the second network;
   means for mapping an existing current packet-switched (PS) security context of the first network into the security context of the second network in response to the request to create or update the security context;
   means for transmitting, to a network entity, a notification of the security context mapped from the existing PS security context; and
   means for transmitting an indication to the UE to derive the security context for the second network.

19. The wireless communications apparatus of claim 18, wherein the request to create or update the security context is included in one of:
   an attach request,
   a tracking area update (TAU) message, or
   a routing area update (RAU) message.

20. The wireless communications apparatus of claim 18, further comprising:
   means for receiving a location update accept message, wherein the indication is a circuit-switched key set identifier assigned from the security context and is included in the location update accept message.

21. The wireless communications apparatus of claim 18, wherein the means for transmitting the notification is configured to:
   send the security context with a location update request message.

22. The wireless communications apparatus of claim 18, wherein the means for mapping the existing current PS security context into the security context is configured to:
   select, as an input to a key derivation function (KDF), at least one of
      an access security management entity key (K ASME),
      a non-access stratum uplink count (NAS COUNT), and
      a circuit-switched public land mobile network identifier (CS PLMN ID); and
   map the existing current PS security context into the security context using the KDF and the selected input.

23. A non-transitory computer-readable medium storing computer-executable code creation or update of a security context, comprising:
   a set of codes for causing a computer to receive, from a user equipment (UE) at a first network, a combined registration request for combined registration of services of the first network and services of a second network;
   a first set of codes for causing the computer to receive a request from the UE to create or update a security context of the second network maintained by the first network in connection with the combined registration and before the UE moves to the second network;
   a second set of codes for causing the computer to map an existing current packet-switched (PS) security context into the security context of the second network in response to the request to create or update the security context;
   a third set of codes for causing the computer to provide a network entity associated with the second network with the security context mapped from the existing current PS security context; and
   a fourth set of codes for causing the computer to transmit an indication to the UE to derive the security context for the second network.

24. The computer-readable medium of claim 23, wherein the first set of codes for causing further comprises:
   a set of codes for receiving:
      an attach request,
      a tracking area update (TAU) message, or
      a routing area update (RAU) message.

25. An apparatus for wireless communication, comprising:
   a memory; and
   at least one processor coupled to the memory and configured to:
   receive, from a user equipment (UE) at a first network, a combined registration request for combined registration of services of the first network and services of a second network;
   receive a request from the UE to create or update a security context of the second network maintained by the first network in connection with the combined registration and before the UE moves to the second network;
   map an existing current packet-switched (PS) security context into the security context of the second network in response to the request to create or update the security context;
   provide a network entity associated with the second network with the security context mapped from the existing current PS security context; and
   transmit an indication to the UE to derive the security context for the second network.

26. The apparatus of claim 25, wherein the at least one processor is configured to map the existing current PS security context into the security context by:
   selecting, as an input to a key derivation function (KDF), at least one of:
      an access security management entity key (K ASME),
      a non-access stratum uplink count (NAS COUNT), and
      a circuit-switched public land mobile network identifier (CS PLMN ID); and
   mapping the existing current PS security context based on the KDF and the selected input.

* * * * *